United States Patent Office 3,082,154
Patented Mar. 19, 1963

3,082,154
IMPROVED FREE-FLOWING COATED ANTI-MALARIAL SALTS IN PARTICULATE FORM
Lionel Victor Allan, Macclesfield, England, assignor to Imperial Chemical Industries Limited, London, England, a corporation of Great Britain
No Drawing. Filed Apr. 12, 1961, Ser. No. 102,377
Claims priority, application Great Britain Apr. 19, 1960
11 Claims. (Cl. 167—82)

This invention relates to new compositions of matter and more particularly it relates to compositions containing a chloroquine salt or an amodiaquine salt which are suitable for admixture with common salt (sodium chloride) or table salt for pharmaceutical purposes, and it also relates to medicated table salt compositions.

It has been proposed to use common salt, hereinafter referred to as table salt, medicated with a chloroquine salt, for example chloroquine phosphate, for the eradication of endemic malaria. A difficulty arises however in storing this medicated table salt under the atmospheric conditions which prevail in the territories where such salt will be used, since there is a tendency to lose the chloroquine salt from the medicated mixture. Under the conditions of high temperature and high humidity prevailing in the countries, for example Brazil, where this medicated table salt is to be used, the medicated mixture becomes very wet, and a solution, rich in chloroquine salt, leaks from the containers, which are usually sacks or paper bags. It has been reported that under the usual storage conditions in Brazil as much as 60% of the chloroquine salt is lost from the medicated table salt in 6 weeks in this way.

We have now found that when a chloroquine salt, for example chloroquine phosphate, or an amodiaquine salt, for example amodiaquine hydrochloride, is mixed or coated with about 10% by weight of a waxy or fatty substance such as cetostearyl alcohol before incorporation into table salt, the medicated table salt eventually obtained can be stored under hot, humid conditions and the tendency for the chloroquine salt or amodiaquine salt to be lost by "leaching-out" due to atmospheric moisture is greatly reduced. Thus, at 37° C. and 100% relative humidity a mixture of 10 parts of chloroquine phosphate and 90 parts of table salt loses about 70% of the chloroquine phosphate content when stored for 6 weeks, whereas a mixture of 90 parts of table salt and 10 parts of coated chloroquine phosphate (coated with 10% w./w. of cetostearyl alcohol) loses only about 10% of the chloroquine phosphate content. Under the same conditions, a medicated table salt containing 0.43% w./w. of amodiaquine hydrochloride loses 50% of the amodiaquine hydrochloride, whereas a medicated table salt containing 0.43% w./w. of coated amodiaquine hydrochloride (coated with 13% w./w. of cetostearyl alcohol) loses no amodiaquine hydrochloride.

Thus according to the invention we provide pharmaceutical compositions comprising a chloroquine salt or an amodiaquine salt in admixture with one or more non-toxic orally-acceptable waxy or fatty substances.

Suitable chloroquine salts are chloroquine phosphate or chloroquine sulphate, and a suitable amodioaquine salt is amodiaquine hydrochloride.

As is well known these antimalarial salts exist in crystalline powder form as may be seen from, for instance, Martindale's The Extra Pharmacopoeia, volume I, 24th edition, pages 1164–1170 (published in 1958 by the Pharmaceutical Press, London).

As suitable waxy or fatty substances there may be mentioned, for example, fatty alcohols such as cetyl alcohol, stearyl alcohol and ceryl alcohol, and mixtures thereof, for example cetostearyl alcohol which is a mixture of solid aliphatic alcohols consisting chiefly of cetyl alcohol and stearyl alcohol; the naturally-occurring solid fats, for example the glycerides of the higher aliphatic acids, for example tristearin, and their hydrogenated derivatives; animal waxes such as beeswax, spermaceti, or derivatives obtained from animal waxes, for example cholesterol or wool alcohols; vegetable waxes such as carnauba wax or candelilla wax; mineral waxes such as hard paraffin; synthetic waxes such as polyvinyl stearate; fatty acids, for example long chain fatty acids such as stearic acid or palmitic acid; esters of fatty acids, for example esters of long chain fatty acids, for example glyceryl monostearate or cetyl palmitate; esters of fatty acids with sorbitan, for example esters of long chain fatty acids with sorbitan, for example sorbitan monopalmitate or sorbitan monostearate; polyoxyethylene derivatives of partial esters of sorbitan such as polyoxyethylene sorbitan monostearate; mono- or di-polyoxyethylene esters of fatty acids, for example mono- or di-polyoxyethylene esters of long chain fatty acids, for example polyoxyethylene monostearate or distearate; condensation products of fatty alcohols with ethylene oxide, for example the condensation product of cetyl alcohol with 17 molecular proportions of ethylene oxide; esters of fatty alcohols with inorganic acids, for example cetyl sulphate; fatty ethers such as cetyl α-glyceryl ether; mineral or vegetable oils such as liquid paraffin or arachis oil, optionally containing thickening agents or preservatives; hydrogenated vegetable or animal oils such as hydrogenated castor oil or hydrogenated whale oil; natural resins such as shellac; and synthetic resins such as cellulose acetate phthalate. Mixtures of any of these waxy or fatty substances may be used where the individual components are compatible. Preferred waxy or fatty substances have a melting point above 40° C.

A particularly valuable waxy or fatty substance is cetostearyl alcohol.

The said pharmaceutical compositions may contain from 4% to 30% w./w. of said waxy or fatty substance, and more particularly from 8% to 18% w./w. of said waxy or fatty substance.

A preferred composition of the invention is that wherein 87 parts by weight of chloroquine phosphate are coated with 13 parts by weight of cetostearyl alcohol.

According to a further feature of the invention we provide a process for the manufacture of the said pharmaceutical compositions which comprises mixing or coating a chloroquine salt or an amodiaquine salt with one or more waxy or fatty substances to provide an intimate mixture of the chloroquine salt or amodiaquine salt and the waxy or fatty substance(s).

It is to be understood that the precise manner of mixing or coating the chloroquine salt or amodiaquine salt with the said waxy or fatty substance will depend upon the chemical and physical properties of the waxy or fatty substance and upon the ease and convenience of its application. Thus the waxy or fatty substance may be dissolved in an inert diluent or solvent, for example acetone or chloroform, and the solution so obtained may be stirred with the chloroquine salt or amodiaquine salt, and the diluent or solvent thereafter removed, for example by evaporation, to provide an intimate mixture of the chloroquine salt or amodiaquine salt and the waxy or fatty substance. Alternatively, a solution of the waxy or fatty substance in an inert diluent or solvent, for example acetone or chloroform, may be sprayed onto the chloroquine salt or amodiaquine salt, preferably while the latter is agitated, whereafter the diluent or solvent is removed, for example by evaporation, from the mixture. The dried product may be sieved or milled in order to provide a fine free-flowing product. Alternatively, when the melting point of the waxy or fatty substance to be used is below about 120° C., a mixture of the chloroquine salt or amodiaquine salt and the said waxy or fatty substance may be heated at a temperature above the melting point of the waxy or fatty substance, and the mixture stirred until uniform. The mixture is then cooled, and may be milled or sieved in order to provide a fine free-flowing product.

The said pharmaceutical compositions may be mixed with table salt to provide a pre-mix composition which itself may be mixed with more table salt to provide a medicated table salt composition, such that, when said medicated table salt composition is used in a normal diet, the intake of the chloroquine salt or amodiaquine salt is sufficient to provide protection against malaria. Alternatively the said pharmaceutical compositions may be mixed with sufficient table salt to provide directly a medicated table salt composition suitable for human consumption.

According to a further feature of the invention we provide medicated table salt compositions which comprise one of the said pharmaceutical compositions of the present invention in admixture with table salt.

As indicated above, the said medicated table salt compositions may be in the form of pre-mix compositions, and such pre-mix compositions may contain, for example, from 2%–50% w./w., and more particularly from 10% to 25% w./w., of the chloroquine salt or amodiaquine salt.

As a particular example of a pre-mix composition of the present invention there may be mentioned a composition containing 81.6% w./w. of table salt and 18.4% w./w. of a coated chloroquine phosphate, the latter being obtained by the general process described above and consisting of 87% w./w. of chloroquine phosphate and 13% w./w. of cetostearyl alcohol; thus this pre-mix composition contains some 16% w./w. of chloroquine phosphate.

As indicated above, the said medicated table salt compositions may be in a form suitable for human consumption. Such medicated table salt compositions conveniently contain from 0.1% to 2% w./w. of the chloroquine salt or amodiaquine salt. As a particular example of a medicated table salt composition suitable for human consumption and effective in the prevention of malaria there may be mentioned a composition consisting of 99.45% w./w. of table salt and 0.55% of coated chloroquine phosphate, the latter being obtained by the general process described above and consisting of 87% w./w. of chloroquine phosphate and 13% w./w. of cetostearyl alcohol; thus this medicated table salt composition contains some 0.48% w./w. of chloroquine phosphate.

The said medicated table salt compositions may be manufactured by conventional procedures.

The invention is illustrated but not limited by the following examples in which the parts are by weight:

Example 1

A solution of 10 gm. of cetyl alcohol in 100 ml. of acetone is intimately mixed with 100 gm. of chloroquine phosphate, and the mixture is then heated with stirring at 50° C. to remove the acetone. The chloroquine phosphate coated with cetyl alcohol is then sieved through a 100-mesh sieve and there is thus obtained coated chloroquine phosphate suitable for incorporation into table salt.

5.5 parts of coated chloroquine phosphate, obtained as described above, and 994.5 parts of sodium chloride are thoroughly mixed. There is thus obtained a medicated table salt suitable for use in malarious areas.

Example 2

A solution of 15 gm. of stearic acid in 100 ml. of chloroform is added with stirring to 100 gm. of chloroquine phosphate. The mixture is heated to 60° C. to remove chloroform and the dried product is then sieved through a 100-mesh sieve. There is thus obtained coated chloroquine phosphate suitable for incorporation into table salt.

5.8 parts of coated chloroquine phosphate, obtained as described above, and 994.2 parts of sodium chloride are thoroughly mixed. There is thus obtained a medicated table salt suitable for use in malarious regions.

Example 3

A solution of 10 gm. of hard paraffin in 50 ml. of chloroform is added with stirring to 100 gm. of chloroquine phosphate, and the mixture is stirred and heated to 60° C. to remove the chloroform. The dried product is sieved through a 100-mesh sieve and there is thus obtained coated chloroquine phosphate which is suitable for incorporation into table salt.

5.5 parts of coated chloroquine phosphate, obtained as described above, and 994.5 parts of sodium chloride are thoroughly mixed. There is thus obtained a medicated table salt which is suitable for use in malarious regions.

Example 4

A mixture of 30 g. of cetostearyl alcohol and 100 g. of chloroquine phosphate is heated to 60° C. and is thoroughly agitated and mixed while being maintained at this temperature until an intimate mixture is obtained. The mixture is then cooled, broken up, and sieved through a 100-mesh sieve.

6.5 parts of coated chloroquine phosphate, obtained as described above, and 993.5 parts of sodium chloride are thoroughly mixed. There is thus obtained a medicated table salt which is suitable for use in malarious regions.

Example 5

A solution of 10 gm. of cetostearyl alcohol in 100 ml. of acetone is intimately mixed with 100 gm. of amodiaquine hydrochloride, and the mixture is then heated with stirring at 50° C. to remove the acetone. The amodiaquine hydrochloride coated with cetostearyl alcohol is then sieved through a 100-mesh sieve and there is thus obtained coated amodiaquine hydrochloride suitable for incorporation into table salt.

5.5 parts of coated amodiaquine hydrochloride, obtained as described above, and 994.5 parts of sodium chloride are thoroughly mixed. There is thus obtained a medicated table salt suitable for use in malarious areas.

Example 6

A solution of 15 gm. of stearic acid in 100 ml. of chloroform is added with stirring to 100 gm. of amodiaquine hydrochloride. The mixture is heated to 60° C. to remove chloroform and the dried product is then sieved through a 100-mesh sieve. There is thus obtained coated amodiaquine hydrochloride suitable for incorporation into table salt.

5.8 parts of coated amodiaquine hydrochloride, obtained as described above, and 994.2 parts of sodium chloride are thoroughly mixed. There is thus obtained a medicated table salt suitable for use in malarious regions.

Example 7

A solution of 15 gm. of hard paraffin in 50 ml. of chloroform is added with stirring to 100 gm. of amodiaquine hydrochloride, and the mixture is stirred and heated to 60° C. to remove the chloroform. The dried product is sieved through a 100-mesh sieve and there is thus obtained coated amodiaquine hydrochloride which is suitable for incorporation into table salt.

5.5 parts of coated amodiaquine hydrochloride, obtained as described above, and 994.5 parts of sodium chloride are thoroughly mixed. There is thus obtained a medicated table salt which is suitable for use in malarious regions.

Example 8

A mixture of 15 gm. of cetostearyl alcohol and 100 gm. of amodiaquine hydrochloride is heated to 60° C.

and is thoroughly agitated and mixed while being maintained at this temperature until an intimate mixture is obtained. The mixture is then cooled and the product is ground in a hammer mill.

4.3 parts of coated amodiaquine hydrochloride, obtained as described above, and 995.7 parts of sodium chloride are thoroughly mixed. There is thus obtained a medicated table salt which is suitable for use in malarious regions. When this medicated table salt is stored in a paper bag at a temperature of 37° C. and at 100% relative humidity, the amodiaquine content is unchanged after 6 weeks. A corresponding reference sample of medicated table salt containing 0.43% by weight of uncoated amodiaquine hydrochloride under the same storage conditions loses 50% of its content of amodiaquine.

*Example 9*

A mixture of 13 gm. of cetostearyl alcohol and 87 gm. of chloroquine phosphate is heated to 60° C. and stirred until uniform. The mixture is then cooled, broken up and sieved through a 100-mesh sieve. There is thus obtained a coated chloroquine phosphate which is suitable for incorporation into table salt.

18.4 gm. of coated chloroquine phosphate, obtained as described above, and 81.6 gm. of sodium chloride are thoroughly mixed. There is thus obtained a pre-mix composition (containing 16% w./w. of chloroquine phosphate) which is suitable for incorporation into table salt.

3 gm. of the pre-mix composition described above and 97 gm. of sodium chloride are thoroughly mixed. There is thus otbained a medicated table salt (containing 0.48% w./w. of chloroquine phosphate) suitable for use in malarious areas.

*Example 10*

(a) A solution of 10 gm. of cetostearyl alcohol in 100 ml. of acetone is intimately mixed with 100 gm. of chloroquine phosphate. The mixture is then stirred at 50° C. until all the acetone has evaporated. The dry solid is sieved through a 100-mesh sieve, and there is thus obtained a coated chloroquine phosphate which is suitable for incorporation into table salt.

(b) The above process is repeated except that the 10 gm. of cetostearyl alcohol used as starting material are replaced by 5 gm. of cetostearyl alcohol. There is thus obtained a coated chloroquine phosphate suitable for incorporation into table salt.

(c) 11 gm. of the coated chloroquine phosphate obtained as described in paragraph (a) above, and 89 gm. of sodium chloride are thoroughly mixed. There is thus obtained a pre-mix composition which is suitable for incorporation into table salt.

(d) The process described in paragraph (c) above is repeated except that the starting materials are replaced by the following:

(d1) 5.5 gm. of the coated chloroquine phosphate obtained as described in paragraph (a) above, and 94.5 gm. of sodium chloride, (d2) 55 gm. of the coated chloroquine phosphate obtained as described in paragraph (a) above, and 45 gm. of sodium chloride, or (d3) 10.5 gm. of the coated chloroquine phosphate obtained as described in paragraph (b) above, and 89.5 gm. of sodium chloride.

There are thus obtained pre-mix compositions which are suitable for incorporation into table salt.

*Example 11*

(a) A solution of 15 gm. of stearic acid in 100 ml. of chloroform is added with stirring to 100 gm. of chloroquine phosphate. The mixture is heated at 60° C. during 24 hours. The mixture is cooled and then sieved through a 100-mesh sieve. There is thus obtained a coated chloroquine phosphate which is suitable for incorporation into table salt.

(b) The process described in paragraph (a) above is repeated except that the starting materials are replaced by the following:

(b1) 15 gm. of hard paraffin, 75 ml. of chloroform, and 100 gm. of chloroquine phosphate, (b2) 15 gm. of beeswax, 75 ml. of chloroform, and 100 gm. of chloroquine phosphate, (b3) 15 gm. of tristearin, 75 ml. of chloroform, and 100 gm. of chloroquine phosphate, (b4) 8 gm. of hydrogenated castor oil, 50 ml. of chloroform, and 100 gm. of chloroquine phosphate, (b5) 10 gm. of wool alcohols, 50 ml. of chloroform, and 100 gm. of chloroquine phosphate, (b6) 25 gm. of the condensation product of cetyl alcohol with 17 moles of ethylene oxide, 100 ml. of acetone, and 100 gm. of chloroquine phosphate, (b7) 10 gm. of cellulose acetate phthalate, 100 ml. of acetone, and 100 gm. of chloroquine phosphate, (b8) 12.5 gm. of liquid paraffin, 15 ml. of chloroform, and 40 gm. of chloroquine phosphlate.

(b9) 1.5 gm. of wool alcohols, 5 ml. of chloroform, and 8.5 gm. of amodiaquine hydrochloride, (b10) 2 gm. of the condensation product of cetyl alcohol with 17 moles o fethylene oxide, 5 ml. of acetone, and 8 gm. of amodiaquine hydrochloride, (b11) 1.25 gm. of liquid paraffin, 5 ml. of chloroform, and 8.75 gm. of amodiaquine hydrochloride, (b12) 1 gm. of cellulose acetate phthalate, 5 ml. of acetone, and 9 gm. of amodiaquine hydrochloride, (b13) 10 gm. of cholesterol, 50 ml. of chloroform, and 100 gm. of chloroquine phosphate, or (b14) 12 gm. of carnauba wax, 100 ml. of chloroform, and 100 gm. of chloroquine phosphate.

There are thus obtained coated forms of chloroquine phosphate or amodiaquine hydrochloride which are suitable for incorporation into table salt.

(c) 0.55 gm. of the coated chloroquine phosphate, obtained as described in paragraph (a) above, is thoroughly mixed with 99.45 gm. of sodium chloride. There is thus obtained a medicated table salt which is suitable for use in malarious areas.

(d) The process described in paragraph (c) above is repeated except that the starting materials are replaced by the following:

(d1) 0.55 gm. of the coated chloroquine phosphate obtained from the starting materials listed in paragraph (b1) above, and 99.45 gm. of sodium chloride, (d2) 0.55 gm. of the coated chloroquine phosphate obtained from the starting materials listed in paragraph (b.2) above, and 99.45 gm. of sodium chloride, (d3) 0.55 gm. of the coated chloroquine phosphate obtained from the starting materials listed in paragraph (b.3) above, and 99.45 gm. of sodium chloride, (d4) 0.52 gm. of the coated chloroquine phosphate obtained from the starting materials listed in paragraph (b4) above, and 99.48 gm. of sodium chloride, (d5) 0.53 gm. of the coated chloroquine phosphate obtained from the starting materials listed in paragraph (b5) above, and 99.47 gm. of sodium chloride, (d6) 0.64 gm. of the coated chloroquine phosphate obtained from the starting materials listed in paragraph (b6) above, and 99.36 gm. of sodium chloride, (d7) 0.53 gm. of the coated chloroquine phosphate obtained from the starting materials listed in paragraph (b7) above, and 99.47 gm. of sodium chloride, (d8) 0.11 gm. of the coated chloroquine phosphate obtained from the starting materials listed in paragraph (b13) above, and 99.89 gm. of sodium chloride, or (d9) 2.27 gm. of the coated chloroquine phosphate obtained from the starting materials listed in paragraph (b14) above, and 97.73 gm. of sodium chloride.

There are thus obtained medicated table salt compositions which are suitable for use in malarious areas.

Example 12

(a) A mixture of 25 gm. of glyceryl monostearate and 100 gm. of chloroquine phosphate is heated at 60° C. and stirred until uniform. The mixture is cooled and then ground in a swing-hammer mill. There is thus obtained a coated chloroquine phosphate which is suitable for incorporation into table salt.

(b) The above process is repeated except that the starting materials are replaced by the following:

(b1) 20 gm. of polyoxyethylene sorbitan monostearate "Tween" 61 and 100 gm. of chloroquine phosphate, (b2) 15 gm. of polyvinyl stearate and 100 gm. of chloroquine phosphate, (b3) 30 gm. of sorbitan monostearate and 100 gm. of chloroquine phosphate, (b4) 12 gm. of cetostearyl alcohol, 3 gm. of liquid paraffin and 100 gm. of chloroquine phosphate, (b5) 0.1 gm. of cetyl alcohol, 1.4 gm. of liquid paraffin and 8.5 gm. of chloroquine phosphate, (b6) 1 gm. of glyceryl monostearate and 9 gm. of amodiaquine hydrochloride, (b7) 1.5 gm. of polyvinyl stearate and 8.5 gm. of amodiaquine hydrochloride, (b8) 0.5 gm. of hydrogenated castor oil and 9.5 gm. of amodiaquine hydrochloride, (b9) 1.5 gm. of sorbitan monostearate and 8.5 gm. of amodiaquine hydrochloride, (b10) 3 gm. of polyoxyethylene sorbitan monostearate ("Tween" 61) and 7 gm. of amodiaquine hydrochloride, (b11) 0.1 gm. of cetyl alcohol, 1.4 gm. of liquid paraffin and 8.5 gm. of amodiaquine hydrochloride, (b12) 15 gm. of polyoxyethylene stearate ("Myrj" 53) and 85 gm. of chloroquine phosphate, or (b13) 2 gm. of a 10% sulphated mixture of cetyl and stearyl alcohols ("Lanette Wax" SX) and 8 gm. of chloroquine phosphate.

There are thus obtained coated forms of chloroquine phosphate or amodiaquine hydrochloride which are suitable for incorporation into table salt.

(c) 0.64 gm. of the coated chloroquine phosphate, obtained as described in paragraph (a) above, is thoroughly mixed with 99.36 gm. of sodium chloride. There is thus obtained a medicated table salt which is suitable for use in malarious areas.

(d) The process described in paragraph (c) above is repeated except that the starting materials are replaced by the following:

(d1) 0.6 gm. of the coated chloroquine phosphate obtained from the starting materials listed in paragraph (b1) above, and 99.4 gm. of sodium chloride, (d2) 0.55 gm. of the coated chloroquine phosphate obtained from the starting materials listed in paragraph (b2) above, and 99.45 gm. of sodium chloride, and (d3) 0.68 gm. of the coated chloroquine phosphate obtained from the starting materials listed in paragraph (b3) above, and 99.32 gm. of sodium chloride.

There are thus obtained medicated table salt compositions suitable for use in malarious areas.

Example 13

100 gm. of chloroquine phosphate are agitated in a small tablet-coating machine, and a solution of 5 gm. of liquid paraffin in 100 ml. of chloroform is sprayed on to the agitated chloroquine phosphate. The mixture is then heated at 60° C. during 24 hours. There is thus obtained a coated chloroquine phosphate which is suitable for incorporation into table salt.

5.2 gm. of the coated chloroquine phosphate, obtained as described above, and 994.8 gm. of sodium chloride are thoroughly mixed. There is thus obtained a medicated table salt which is suitable for use in malarious areas.

Example 14

1 gm. of arachis oil and 19 gm. of chloroquine phosphate are thoroughly mixed, and the mixture is sieved through a 100-mesh sieve. There is thus obtained a coated chloroquine phosphate which is suitable for incorporation into table salt.

The above process is repeated except that the 19 gm. of chloroquine phosphate are replaced by 19 gm. of amodiaquine hydrochloride. There is thus obtained a coated amodiaquine hydrochloride which is suitable for incorporation into table salt.

What I claim is:

1. A free-flowing particulate pharmaceutical composition comprising antimalarial salt in particulate form selected from the group consisting of chloroquine salts and amodiaquine salts coated with at least one non-toxic orally-acceptable water resistant coating substance selected from the group consisting of waxy and fatty substances, said coating substance being present in an amount sufficient to inhibit leaching out of said salt due to atmospheric moisture but insufficient to inhibit in vivo absorption.

2. A composition according to claim 1 wherein said chloroquine salt is chloroquine phosphate.

3. A composition according to claim 1 wherein said chloroquine salt is chloroquine sulphate.

4. A composition according to claim 1 wherein said amodiaquine salt is amodiaquine hydrochloride.

5. A composition according to claim 1 wherein said substance is selected from the group consisting of fatty alcohols; naturally-occurring solid fats; animal, vegetable and mineral waxes; fatty acids; esters of fatty acids; condensation products of fatty alcohols with ethylene oxide; esters of fatty alcohols; fatty ethers; mineral and vegetable oils; hydrogenated vegetable and animal oils.

6. A pharmaceutical composition comprising chloroquine phosphate coated with cetostearyl alcohol.

7. A composition according to claim 6 comprising 87 parts by weight of chloroquine phosphate with 13 parts by weight of cetostearyl alcohol.

8. A process for preparing a free-flowing particulate medicated table salt composition which comprises first coating an antimalarial salt in particulate form selected from the group consisting of chloroquine salts and amodiaquine salts with at least one non-toxic orally-acceptable water-resistant coating substance selected from the group consisting of waxy and fatty substances, said coating substance being present in an amount sufficient to inhibit leaching out of said antimalarial salt due to atmospheric moisture but insufficient to inhibit in vivo absorption, and then adding the resulting product with table salt, so as to form a mixture containing from 0.1% to 50% by weight of said antimalarial salt, and containing said coating substance in an amount of at most 30% by weight of said antimalarial salt.

9. The product of the process of claim 8 containing more than 2% and up to 50% by weight of said antimalarial salt and suitable as a pre-mix composition for admixture with more table salt to provide a medicated table salt composition.

10. The product of the process of claim 8 containing from 0.01% to 2% by weight of said antimalarial salt, and suitable for human consumption as a medicated table salt composition to be used in a normal diet.

11. A process for eradicating endemic malaria which comprises utilizing a free-flowing particulate composition of table salt having admixed therewith an antimalarial salt selected from the group consisting of chloroquine salts and amodiaquine salts coated with at least one non-toxic orally-acceptable water-resistant coating substance selected from the group consisting of waxy and fatty substances, said coating substance being present in an amount sufficient to inhibit leaching out of said antimalarial salt due to atmospheric moisture but insufficient to inhibit in vivo absorption, and said antimalarial salt being present in an amount of between 0.01% and 2% by weight of said composition.

References Cited in the file of this patent

UNITED STATES PATENTS

| | | |
|---|---|---|
| Re. 24,090 | Diamond | Nov. 15, 1955 |
| 379,299 | Weld | Mar. 13, 1888 |
| 609,342 | Grove | Aug. 16, 1898 |
| 631,632 | Grove | Aug. 22, 1899 |
| 633,448 | Grove | Sept. 19, 1899 |
| 2,191,678 | Nitardy et al. | Feb. 27, 1940 |
| 2,288,409 | Lippman et al. | June 30, 1942 |
| 2,478,182 | Consolazio | Aug. 9, 1949 |
| 2,539,012 | Diamond et al. | Jan. 23, 1951 |
| 2,762,746 | Barnett | Sept. 11, 1956 |
| 2,955,982 | Moeller et al. | Oct. 11, 1960 |
| 2,956,926 | Greif | Oct. 18, 1960 |
| 2,957,804 | Schuyler | Oct. 25, 1960 |
| 3,009,775 | Ladenburg et al. | Nov. 21, 1961 |
| 3,019,169 | Klumpp et al. | Jan. 30, 1962 |
| 3,048,525 | Baugh | Aug. 7, 1962 |

FOREIGN PATENTS

| | | |
|---|---|---|
| 109,438 | Australia | Jan. 11, 1940 |

OTHER REFERENCES

Pinotti, M.: "A New Method of Malaria Prophylaxis: The Addition of an Antimalarial Drug to Cooking Salt Used in the Daily Preparation of Food" (English summary follows Portuguese text), Rev. Brasileira Malariologia, Rio de Janeiro, Brazil, January 1954, vol. 6, No. 1, pp. 5–12; abstracted in English in Trop. Dis. Bull., vol. 52, pp. 10–12 (1955).

Micciche: "La Preparazione di Medicamenti per Uso Orale Cessione Ritardata Prestabilita" (Oral Medicinal Preparation With Fixed Retardation of Release), Bolletino Chimico Farmaceutico, Milan, vol. 94, pp. 485–493 (1955), in Italian. Abstracted in Chem. Abstracts, vol. 50, No. 7, #5242 F.G.h., April 10, 1956. Official Patent Translation (16 pp.).

Martin et al.: "Remington's Practice of Pharmacy, 11th ed., pp. 400–419, published 1956, Mack Publishing Company, Easton, Pa.

Chapman et al.: "Physiological Availability of Drugs in Tablets," Canad. Med. Assn. J., vol. 76, pp. 102–106, Jan. 15, 1957.

Jenkins et al.: "Scoville's The Art of Compounding, 9th ed., pp. 75–79, 86–89, 91–92, 105–108, published 1957, McGraw-Hill Book Company, New York, New York.

Dragstedt: "Oral Medication With Preparations for Prolonged Action," J.A.M.A., vol. 168, No. 12, pp. 1652–1655, Nov. 22, 1958.

Martin et al.: "Husa's Pharmaceutical Dispensing, 5th ed., pp. 93–100, 577–590, published 1959, Mack Publishing Company, Easton, Pa.

Lazarus et al.: "Oral Prolonged Action Medicaments: Their Pharmaceutical Control and Therapeutic Aspects," J. Pharm. and Pharmacol., vol. 11, No. 5, pp. 257–290 (pp. 266–271, 277–279, and 285–288 are especially pertinent to In Vivo Tablet Availability of Drugs) May 1959.

Campbell et al.: "Oral Prolonged Action Medication," Practitioner, vol. 183, pp. 758–765, December 1959.

Gross et al.: "Transformulation to Filmcoating," Drug and Cosmetic Industry, vol. 86, No. 2, pp. 170–171, 264, 288–291, February 1960.